United States Patent [19]

Lee

[11] 4,339,176
[45] Jul. 13, 1982

[54] HOLOGRAPHIC SPACE-VARIANT SYSTEM FOR EVALUATING THE AMBIGUITY INTEGRAL

[75] Inventor: Tzuo-Chang Lee, Bloomington, Minn.

[73] Assignee: Honeywell Inc., Minneapolis, Minn.

[21] Appl. No.: 150,777

[22] Filed: May 19, 1980

[51] Int. Cl.³ .................. G02B 27/46; G01S 13/58; G06G 9/00

[52] U.S. Cl. ...................... 350/162 SF; 343/9 PS; 364/822

[58] Field of Search ............... 350/3.68, 162 SF; 364/822; 343/9 PS

[56] References Cited

U.S. PATENT DOCUMENTS

| | | | |
|---|---|---|---|
| 3,509,565 | 4/1970 | Wilmotte | 364/822 |
| 4,071,907 | 1/1978 | Casasent | 364/822 |
| 4,087,815 | 5/1978 | Garrison et al. | 343/9 |
| 4,123,142 | 10/1978 | Fleming et al. | 350/162 SF |
| 4,286,328 | 8/1981 | Bocker | 364/822 |
| 4,310,894 | 1/1982 | Lee et al. | 343/9 PS |

Primary Examiner—John K. Corbin
Assistant Examiner—Bruce Y. Arnold
Attorney, Agent, or Firm—Omund R. Dahle; Stephen W. Buckingham

[57] ABSTRACT

An optical system for creating the ambiguity function of a moving target is disclosed. The two signals which are to be used in the analysis are coded on spatial data masks as two-dimensional arrays of one-dimensional functions. The frequency scaling property of a post lens Fourier Transform is utilized to apply a variable scaling factor to at least one of the functions. This is accomplished by passing a beam of substantially coherent light through a cylindrical Fourier Transform lens before it passes through the data masks. At least one of the data masks is then set at an angle other than perpendicular to the beam path.

11 Claims, 8 Drawing Figures

RECORDING OPTICS

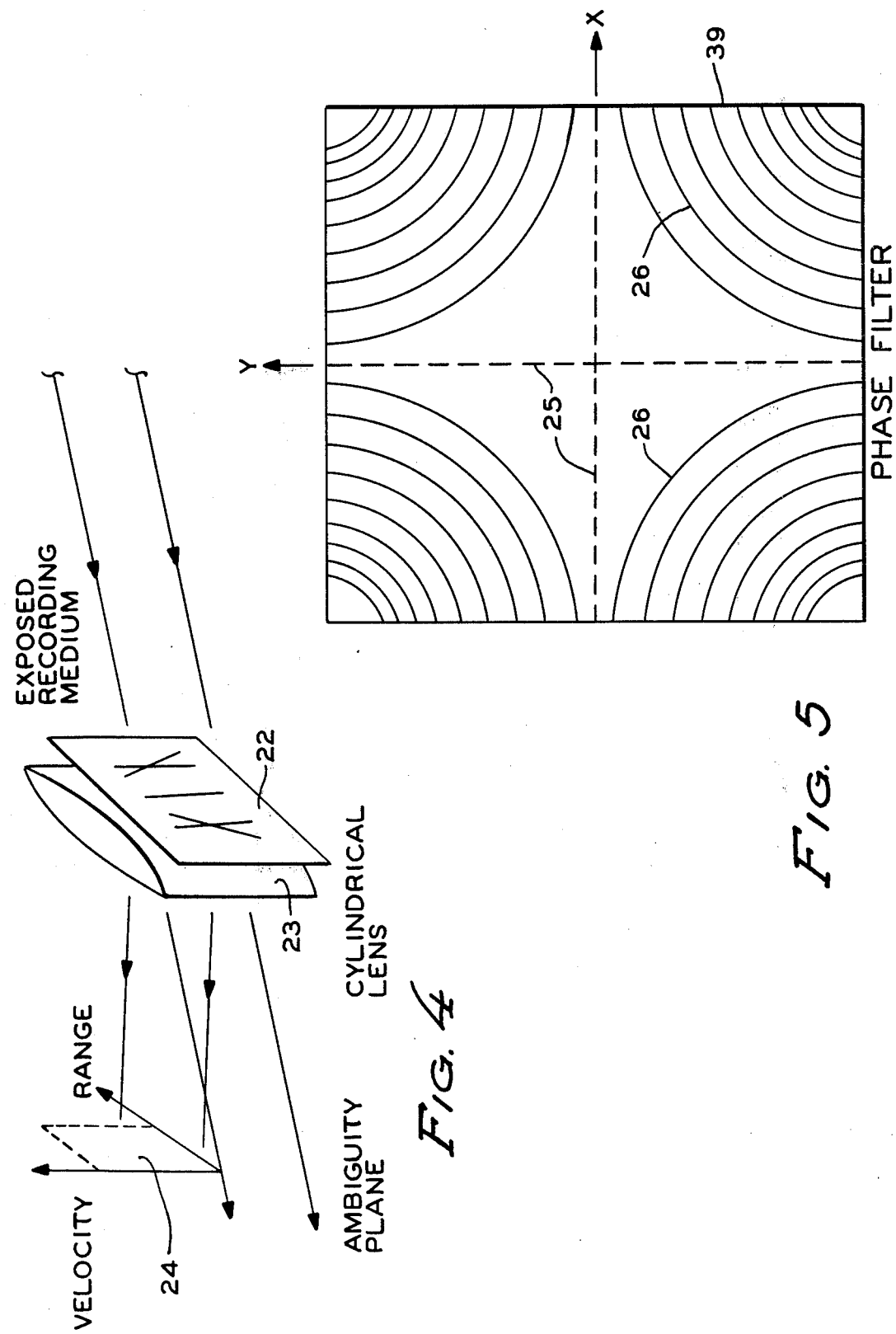

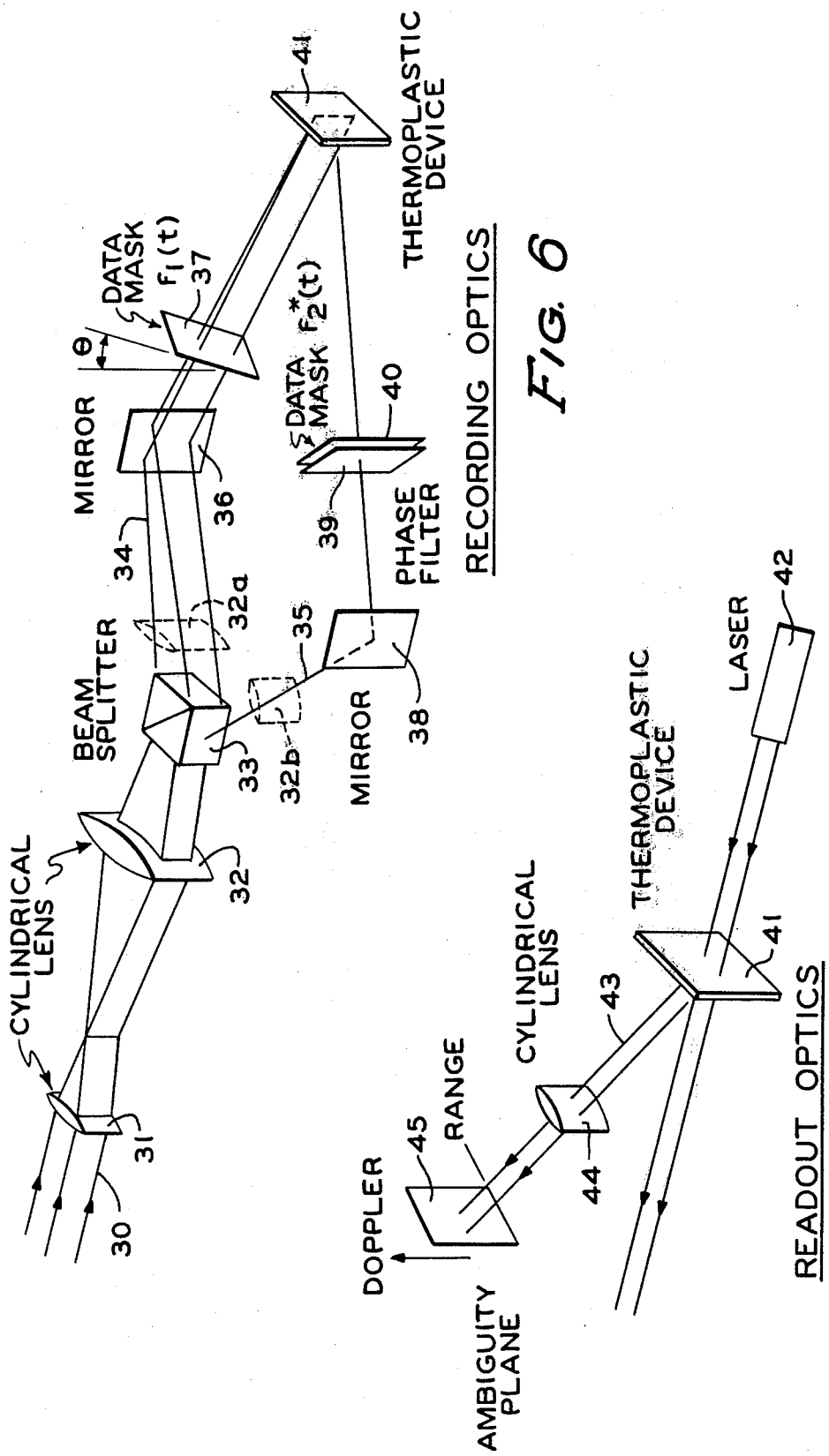

HOLOGRAPHIC SPACE-VARIANT SYSTEM FOR EVALUATING THE AMBIGUITY INTEGRAL

BACKGROUND OF THE INVENTION

Under many circumstances an acoustic or electromagnetic signal is received from a moving source and information as to the location and velocity of the source is desirable. Examples of where this occurs are undersea surveillance and radar surveillance. A common method of representing this is on a graph known as an ambiguity plane, where distance is plotted against velocity. The relative doppler shift and time shift between two signals so received can be used to extract this data.

The ambiguity plane is prepared by evaluating the ambiguity integral which is defined as $$\chi(\omega,\tau) = \int dt\, f_1(t) f_2^*(t-\tau) e^{i\omega t} \quad (1)$$

In this equation $f_1(t)$ and $f_2(t)$ are the two signals being compared expressed as functions of time. The variable $\tau$ is introduced to correct for the fact that although it is expected that $f_1(t)$ and $f_2(t)$ should have a similar form, they will, in general, be shifted in time relative to each other. The function $f_2^*(t-\tau)$ is the complex conjugate of $f_2(t-\tau)$ which is the time shifted version of the signal actually received. The factor $e^{i\omega\tau}$ is introduced to correct for the frequency difference between $f_1(t)$ and $f_2(t)$, caused by the doppler effect. The values of $\omega$ and $\tau$ which yield a maximum value of the ambiguity integral may be used to extract information about the velocity and range of the object under surveillance.

In order to be useful for surveillance purposes the information displayed on an ambiguity surface must be as current as possible. For this reason evaluation of the integral (1) must be performed in real time. The ability of optical analog processing to process multiple channels of data rapidly in a parallel fashion has led to its acceptance as a method for ambiguity function calculations. One such method is shown in the copending application, Ser. No. 105,809, now U.S. Pat. No. 4,310,894, assigned to the same assignee as the instant invention.

Most prior art ambiguity processors have suffered inaccuracies because they have operated on the doppler shift of the carrier frequency, but have not dealt with the time scaling of the modulating function. One system which does consider the time scaling of the modulating function is described in U.S. Pat. No. 4,123,142 issued to Fleming et al. The system of the Fleming patent requires the construction of the "channelized" lens, which is more complicated and difficult to construct than the lenses of the present invention. It also provides values of the ambiguity integral only for discrete values of $\tau$ rather than the continuum provided in the present invention.

SUMMARY OF THE INVENTION

The invention provides a method of scaling the time variable of an input function for ambiguity processing. In this manner it is possible to take into account the effect of time scaling on the modulating function as well as on the carrier frequency. The frequency scaling properties of the post lens Fourier Transform are utilized to obtain the desired scaling. It is possible to set one data mask at an angle not perpendicular to the light beam. Each horizontal slice of the data mask will then be a different distance from the Fourier Transform plane than every other similar slice. Because the distance from the data mask to the Fourier Transform plane is an element of the scaling factor, the invention provides a method of establishing a variable scaling factor.

BRIEF DESCRIPTION OF THE DRAWINGS

FIG. 4 shows the readout optics which accompany the system shown in FIG. 3.

FIG. 5 shows a phase filter used in the invention.

FIG. 6 shows the recording optics used in a preferred embodiment of the invention.

FIG. 6A shows the readout optics which accompany FIG. 6.

DETAILED DESCRIPTION OF THE INVENTION

Figure 1:
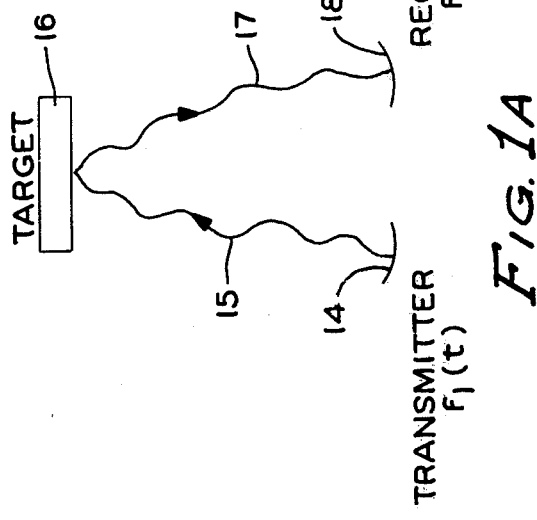
FIG. 1 shows a basic scenario where ambiguity processing may be used.

FIG. 1 shows a typical scenario in which ambiguity processing might be used. Target 10 emits a signal 11 which is transmitted in all directions. The signal 11 has the form $$f(t) = \mu(t) e^{i\omega_0 t} \quad (2)$$

Signal 11 is observed at the first receiver 12 and the second receiver 13. If the target is moving, signal 11 will be subject to a doppler shift when observed. We define the doppler ratios $$\alpha_1 = \frac{V_1}{V_1 + V_s} \; ; \; \alpha_2 = \frac{V_2}{V_2 + V_s} \quad (3)$$

where $V_1$ is the component of the velocity of the target along a line passing through the first receiver 12 and $V_2$ is the component of the velocity of the target along a line passing through the second receiver 13. The variable $V_s$ represents the propagation velocity of the signal 11. Using these definitions, the signals received by the first receiver 12 and the second receiver 13 are respectively:

$$f_1(t) = \mu(\alpha_1(t-t')) e^{i\alpha_1 \omega_0 (t-t')} \quad (4)$$

$$f_2(t) = \mu(\alpha_2(t-t'-t_0)) e^{i\alpha_2 \omega_0 (t-t'-t_0)} \quad (5)$$

In these equations $t'$ is time required for the signal 11 to reach the first receiver 12 and $t' + t_0$ is the time required for the signal 11 to reach the second receiver 13. We can replace $t - t'$ with $t$ to give:

$$f_1(t) = \mu(\alpha_1 t) e^{i\alpha_1 \omega_0 t} \quad (6)$$

$$f_2(t) = \mu(\alpha_2(t-t_0)) e^{i\alpha_2 \omega_0 (t-t_0)} \quad (7)$$

Figure 1A:
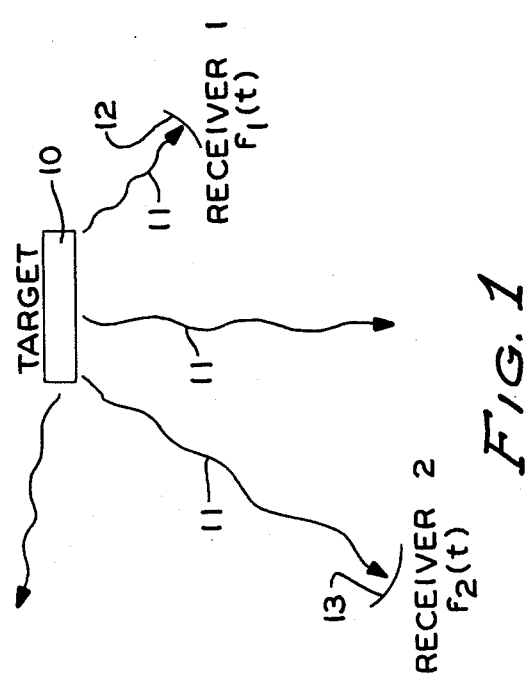
FIG. 1A shows a variation of FIG. 1.

FIG. 1A illustrates a variation of FIG. 1. FIG. 1A shows the situation when the ambiguity plane is to be calculated for radar surveillance. Transmitter 14 emits a signal 15 which is $f_1(t)$. Signal 15 propagates to a target 16 and a reflected signal 17 propagates to a receiver 18. Signal 17, as observed by receiver 18, has the form of $f_2(t)$. In the special case of FIG. 1A $\alpha_1$ is equal to 1. The analysis which follows applies equally well to signals obtained from a system such as FIG. 1 or FIG. 1A.

The functions $f_1(t)$ and $f_2(t)$ may be correlated. The value of the correlation, $C(\tau)$, is given by:

$$C(\tau) = \int dt\, f_1(t) f_2^*(t-\tau) \tag{8}$$

where $f_2^*(t-\tau)$ is the complex conjugate of $f_2(t-\tau)$. Combining equations 6, 7, and 8 it is clear that $$C(\tau) = \int dt\, \mu(\alpha_1 t)\mu^*(\alpha_2(t-t_o-\tau))e^{i(\alpha_1-\alpha_2)\omega_o t}e^{i\alpha_2\omega_o(t_o+\tau)} \tag{9}$$

The factor $e^{i\alpha_2\omega_o(t_o+\tau)}$ is an irrelevant phase term and may be ignored. Looking at the remaining factors it is clear that will be impossible to produce a correlation maximum because of the different doppler factors in $f_1(t)$ and $f_2(t)$. This may be overcome by applying a scaling factor, $\beta$, to the time variable in $f_1(t)$. Equation (9) then becomes:

$$\chi(\tau,\beta) = \int dt\, \mu(\alpha_1\beta t)\mu^*(\alpha_2(t-t_o-\tau))e^{i(\alpha_1\beta-\alpha_2)\omega_o t} \tag{10}$$

Equation (10) is equivalent to the ambiguity integral of equation (1). It is clear that the following conditions are necessary for an ambiguity maximum:

$$\beta = \alpha_2/\alpha_1 \tag{11}$$

$$\tau = -t_o \tag{12}$$

Figure 2:
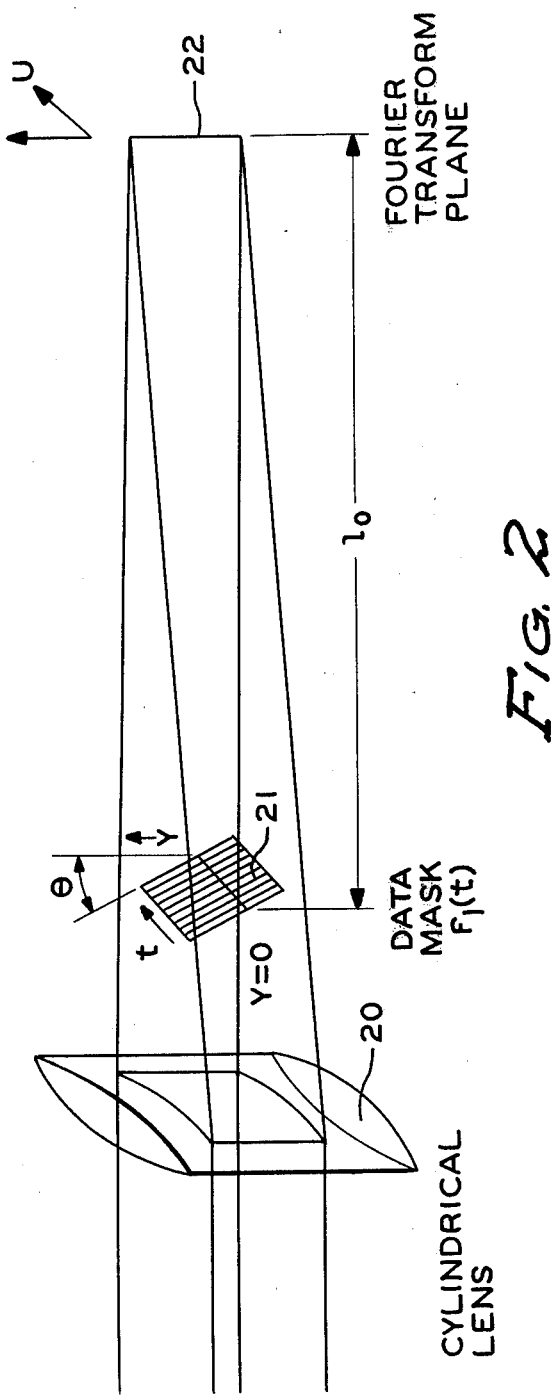
FIG. 2 shows a post lens Fourier Transform with a variable scaling factor.

The scaling factor $\beta$ is applied by the use of a post lens Fourier Transform. FIG. 2 illustrates this technique. Light from a coherent source, such as laser, not shown, is directed through a cylindrical lens 20. A data mask 21 is placed in the light beam after lens 20. Recorded on data mask 21 is a two-dimensional array of the one-dimensional function $f_1(t)$. In other words, any horizontal slice of data mask 21 will contain the same information when the horizontal dimension is used for the independent variable t. It is known that the frequency spectrum of the function on the data mask 21 will appear along the horizontal axis of the Fourier Transform plane 22. The frequency will be scaled according to:

$$u = \lambda l x \tag{13}$$

when u is the coordinate used on the frequency axis of the Fourier Transform plane 22, $\lambda$ is the wavelength of light used, and l is the distance from the data mask to the Fourier Transform plane 22. By placing data mask 21 at an angle to the perpendicular to the light beam, as shown, it is possible to vary the distance from one portion of the mask to another.

It is clear that the effect of varying l will be to provide the scaling factor $\beta$ which is desired. If $l_0$ is the distance from the data mask 21 to the Fourier Transform plane when $y=0$ the scaling factor is determined by $$\beta = \lambda l/\lambda l_0 = l/l_0 \tag{14}$$

where $$l = l_o + l' \tag{15}$$

In this expression $l'$ is the change in l caused by the tilt. It may easily be shown that $$l' = y(\tan\theta) \tag{16}$$

Therefore $$\beta = \frac{l_o + y(\tan\theta)}{l_o} = 1 + \left(\frac{y}{l_o}\right)\tan\theta \tag{17}$$

Figure 3:
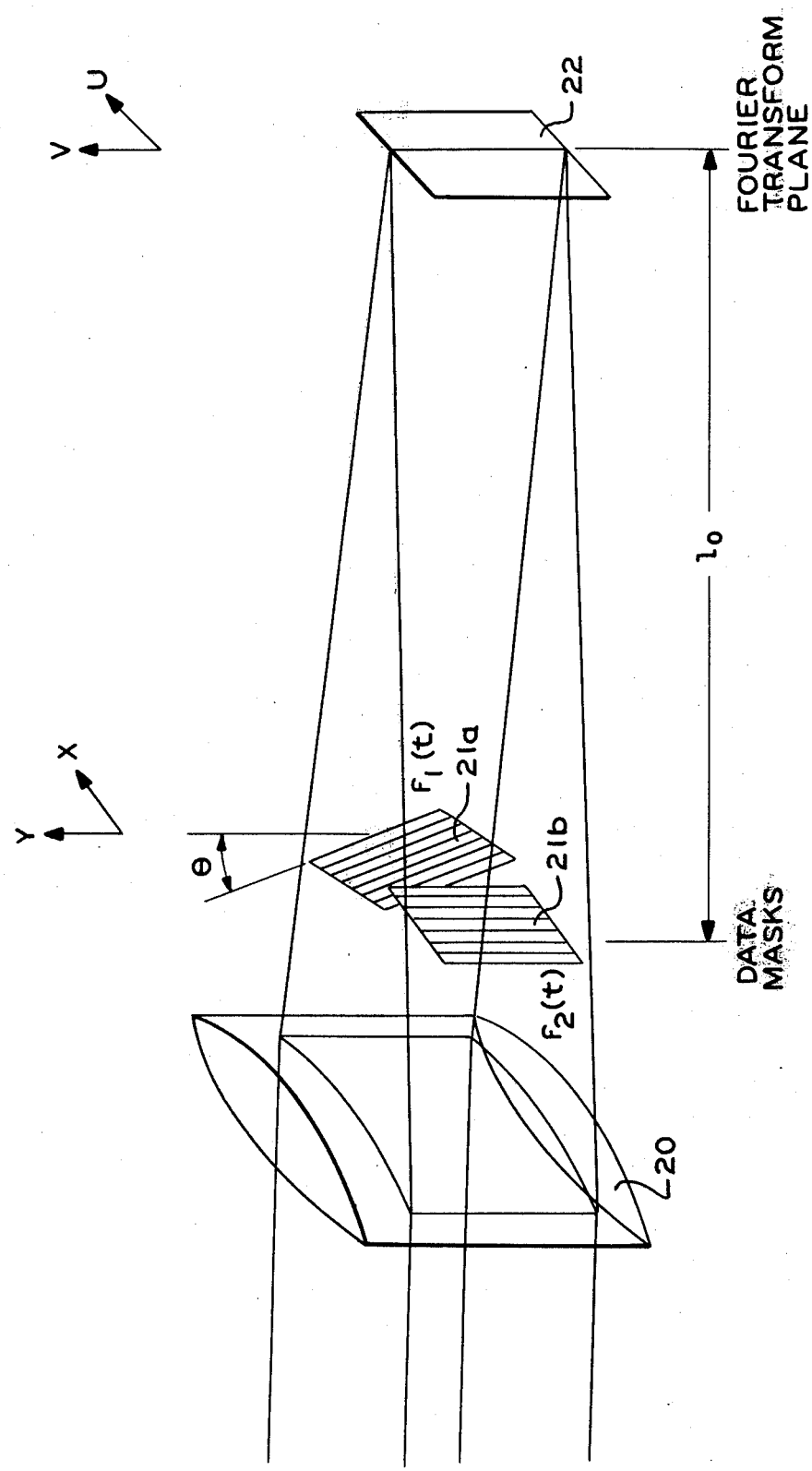
FIG. 3 shows a post lens joint Fourier Transform for use in ambiguity processing.

The analysis given above may be applied to ambiguity processing as shown in FIG. 3. A light beam from a coherent source, not shown, passes through cylindrical lens 20 and data masks 21(a) and 21(b). Data masks 21(a) and 21(b) lie in different sides of the light beam respectively and are set at different angles to the beam. In the simplest approach data mask 21(b) is perpendicular to the light beam while data mask 21(a) deviates from the perpendicular to the light beam by an angle $\theta$. The result is the product $F_1(\beta\omega)F_2^*(\omega)$, known as the Joint Fourier Transform, which appears in the Fourier Transform plane 22. In this expression $F_1$ and $F_2^*$ are the Fourier Transforms of $f_1$ and $f_2^*$ respectively. A recording medium such as photographic film or a thermoplastic device is placed in the Fourier Transform plane 22.

One problem arises as a result of using the post lens Fourier Transform. The problem involves an extra phase factor in the formula for the Fourier Transform. This formula is:

$$\mathcal{F}[f(t)] = [\int dt\, f(t)e^{-i\omega t/\lambda l}]e^{iku^2/2l} \tag{18}$$

where $\mathcal{F}$ is the Fourier Transform operator. This phase factor cancels in $F_1 F_2^*$ when $l=l_o$, but produces a phase shift of $\phi$ at all other values of l where $\phi$ is given by:

$$\phi = \frac{ku^2}{2}\left(\frac{1}{l_o} - \frac{1}{l}\right) \tag{19}$$

The phase shift can be eliminated in the readout process. It is canceled by illuminating the developed film in the direction antiparallel to the original exposing beam as viewed from the recording medium and placing a cylindrical lens directly behind the film. If the lens 23 has a variable focal length of $l'$, a phase shift of $\phi'$ is introduced. $\phi'$ is given by:

$$\phi' = -ku^2/2l \tag{20}$$

Therefore by placing the readout screen to intercept the first order diffracted beam at a distance $l_o$ the phase shift is eliminated. One method of implementing the analysis above is shown in FIG. 4. The exposed recording device from the Fourier Transform plane 22 of FIG. 3 is illuminated by coherent light in the direction antiparallel to the original exposing beam. A cylindrical lens with focal length l is placed directly behind the film. In addition to the phase shift discussed above the lens performs a Fourier Transform in the horizontal dimension. The result is the formation of the following in plane 24:

$$\mathcal{F}[F_1(\beta u)F_2^*(u)] = \int dt\, f_1(\beta t)f_2^*(t-\tau) \tag{21}$$

Equation (21) is the same as the ambiguity integral of equations (1) and (10). In order to find the ambiguity maximum it is necessary only to search the output plane for the point of greatest light intensity, i.e., the brightest point.

Because of the physical limitations of the optics certain changes are made in a preferred embodiment. One change made is to reduce the space-frequency product required of the light valves used to produce the data masks. It should be noted here that in principle the light valves could be used to code the signal of interest directly within the invention, but the space-frequency product of the signal would be too large for most currently available light valves such as the liquid crystal light valves, the Bragg cell or the PROM device. Reduction of the space-frequency product can be accomplished by down converting the signals, $f_1(t)$ and $f_2(t)$ to a lower frequency. The down conversion may be accomplished by heterodyning or other well known techniques. If the down conversion shifts the frequency by an amount $\omega_o$ and the down converted functions are denoted with primes, the functions to be processed become:

$$f_1'(t) = \mu(\alpha_1 t) e^{i(\alpha_1 - 1)\omega_o t} \quad (22)$$

and $$f_2'(t) = \mu[\alpha_2(t - t_o)] e^{i(\alpha_2 - 1)\omega_o(t - t_o)} e^{-i\omega_o t_o} \quad (23)$$

Satisfying equations (11) and (12) will not be sufficient to obtain an ambiguity maximum for $f_1'(t)$ and $f_2'(t)$. This is because of an additional phase term which arises. The phase shift occurs because when equation (11) is satisfied the following is true:

$$\beta(\alpha_1 - 1) = \alpha_2 - (\alpha_2/\alpha_1) \quad (24)$$

In general, the expression of equation (24) will not cancel the $(\alpha_2 - 1)$ term. Therefore an additional phase factor, $\phi$, must be included in the ambiguity integral. In order to simplify the expression the ambiguity integral is considered only for the case where equation (12) is satisfied. This is reasonable, as equation (12) is a necessary condition for an ambiguity maximum. Under these conditions equation (10) becomes $$\chi(-t_o, \beta) = \int dt \, \mu(\alpha_1 \beta t) \mu^*(\alpha_2 t) e^{i[\beta(\alpha_1 - 1)\omega_o t - (\alpha_2 - 1)\omega_o t - \phi]} \quad (25)$$

In order to obtain a maximum from equation (25), equation (11) must be satisfied and $\phi$ must be given by:

$$\phi = (1 - \beta)\omega_o t \quad (26)$$

As $\phi$ is not dependent on $f_1(t)$ or $f_2(t)$ it is a passive phase function. The nature of the function will be determined by $\theta$, $l_o$, and $\omega_o$. Using equations (14), (15), (16), (17) and (26) the needed phase factor may be calculated.

$$\phi = \left(1 - \frac{l}{l_o}\right) \omega_o t = \left(1 - \left(\frac{l - l_o}{l_o} + \frac{l_o}{l_o}\right)\right) \omega_o t \quad (27)$$

$$= \left(1 - \left(\frac{l - l_o}{y} \cdot \frac{y}{l_o} + 1\right)\right) \omega_o t$$

$$= \tan\theta \left(\frac{y}{l_o}\right) \omega_o t$$

A phase mask determined by equation (27) may be placed in front of the data mask containing $f_2'(t)$ to insure the existance of an ambiguity maximum. FIG. 5 shows a phase filter 39 constructed according to equation (27). The x and y axes 25 are shown for convenience, but would not be visible on an actual filter. The curves 26 represent contour lines on the surface of the filter.

A second change which may be made is the use of a dual axis joint Fourier Transform rather than the single axis system shown in FIG. 3. FIGS. 6 and 6A show a preferred embodiment comprising the down converted signals $f_1'(t)$ and $f_2'(t)$ and the dual axis joint Fourier Transform. FIG. 6 illustrates the recording optics. Light beam 30 is emitted by a coherent source, not shown, and expanded and collimated by lenses, not shown. It passes through cylindrical lens 31 and cylindrical lens 32, which is used for the post lens Fourier Transform. In an alternative embodiment lenses 32(a) and 32(b) may be used instead of lens 32 to produce the post lens Fourier Transform. If lenses 32(a) and 32(b) are used, it is important that the Fourier planes associated with them coincide. The light beam 30 passes through beam splitter 33 and is split into beams 34 and 35. Individual light beams 34 and 35 may be regarded as equivalent to the two sides of the beam as described in conjunction with FIG. 3. Beam 34 is reflected by mirror 36 and passes through the data mask 37 which codes the light with the function $f_1'(t)$. Data mask 37 is set an angle to the vertical as shown. Beam 35 is reflected by mirror 38 and passes through the phase filter 39 and data mask 40. Phase filter 39 is constructed according to equation (27) above. In general the angle between data mask 37 and light beam 34 will be different from that between data mask 40 and light beam 35. In the preferred embodiment data mask 40 is perpendicular to light beam 35 while data mask 37 deviates from perpendicular to light beam 34 by an angle $\theta$. Data mask 40 codes light beam 35 with $f_2'^*(t)$. Light beams 34 and 35 merge and are recorded in plane 41. The recording medium in plane 41 may be photographic film, a thermoplastic device, or another photosensitive material.

FIG. 6A shows the readout optics. Light from a laser 42 passes through the recording medium 41 which was exposed in the recording process. The light passes through the recording medium in a direction antiparallel to the direction of exposing beam 34 as viewed from the recording medium. A first order diffracted beam 43 emerges from the recording medium and passes through cylindrical lens 44, which performs a Fourier Transform in the horizontal dimension. The plane where the Fourier Transform produced by cylindrical lens 44 is in focus is the ambiguity plane 45. Ambiguity plane 45 is searched for its brightest spot. The location of that spot will be related to the relative doppler shift and timing of the two signals. The detector in the ambiguity plane 45 may be photographic film, an array of photodetectors or a vidicon. Other detection methods will be readily discerned by those skilled in the art.

The embodiments of the invention in which an exclusive property or right is claimed are defined as follows:

1. A holographic system utilizing a beam of substantially coherent light to create a hologram useful in evaluating an ambiguity function arising from a first signal and a second signal, said light beam following a light beam path, and said system including a recording means comprising:
   a cylindrical Fourier Transform lens means in said light beam path and having a Fourier Transform plane associated with said Fourier Transform lens means;
   a substantially planar, first data mask coded with said first signal and a substantially planar, second data mask coded with said second signal, said data masks positioned in said light beam path between said Fourier Transform lens means and said Fourier Transform plane, the normal to said first data mask forming a first angle with said light beam path and the normal to said second data mask forming a second angle with said light beam path, said first and second angles being nonequal angles; and
   a holographic recording medium positioned in said Fourier Transform plane associated with said cylindrical Fourier Transform lens means for recording a joint Fourier Transform.

2. A holographic system as described in claim 1 and further including readout means comprising:
   an exposed holographic recording medium prepared by the recording means;
   means to illuminate said exposed holographic recording medium with a beam of substantially coherent light in a direction with respect to said exposed holographic recording medium antiparallel to that of said light beam path of the recording means;
   a first order diffracted beam path emerging from said exposed holographic recording medium;
   cylindrical lens means with a known focal length positioned so that said first order diffracted beam path passes through said cylindrical lens means; and
   detection means placed a distance from said cylindrical lens means equal to said focal length of said cylindrical lens means.

3. A holographic system to create a hologram useful in evaluating an ambiguity function arising from a first signal and a second signal, said system including recording means utilizing first and second beams of substantially coherent light, following first and second light beam paths respectively, said recording means comprising:
   first cylindrical Fourier Transform lens means positioned in said first light beam path with a first Fourier Transform plane associated with said first cylindrical Fourier Transform lens means;
   second cylindrical Fourier Transform lens means positioned in said second light beam with a second Fourier Transform plane associated with said second cylindrical Fourier Transform lens means, said first and second cylindrical Fourier Transform lens means arranged so that said first and second Fourier Transform planes are coincident;
   a substantially planar, first data mask coded with said first signal positioned in said first light beam path between said Fourier Transform lens means and said Fourier Transform plane, the normal to said first data mask forming a first angle with said first light beam path
   a substantially planar second data mask coded with said second signal positioned in said second light beam path between said Fourier Transform lens means and said Fourier Transform plane, the normal to said second data mask forming a second angle with said second light beam path, said first and second angles being nonequal angles and
   a holographic recording medium at the coincident location of said first and second Fourier Transform planes for recording a joint Fourier Transform.

4. A holographic system as described in claim 3 further comprising a passive phase mask in said first light beam path and adjacent to said first data mask.

5. A holographic system as described in claim 3 further including readout means comprising:
   an exposed holographic recording medium prepared by the recording means;
   means to illuminate said exposed holographic recording medium with a beam of substantially coherent light in a direction with respect to said exposed holographic recording medium antiparallel to that of said second light beam path;
   a first order diffracted beam path emerging from said exposed recording medium;
   cylindrical lens means with a known focal length, positioned so that said first order diffracted beam path passes through said cylindrical lens means; and
   detection means placed at a distance from said cylindrical lens means equal to said focal length of said cylindrical lens means.

6. A holographic system to create a hologram useful in evaluating an ambiguity function arising from a first signal and a second signal, said system including recording means utilizing a beam of substantially coherent light following a light beam path, said recording means comprising:
   cylindrical Fourier Transform lens means in said light beam path and having a Fourier Transform plane associated with said lens means;
   a beam splitter placed after said lens means in said light beam path to divide said beam into a first light beam and a second light beam following first and second light beam paths respectively;
   means to cause said first and second light beams to recombine in said Fourier Transform plane; a substantially planar, first data mask in said first light beam path and located before said Fourier Transform plane, said first data mask being coded as a function of said first signal, the normal to said first data mask forming a first angle with said first light beam path;
   a substantially planar second data mask in said second light beam path and located before said Fourier Transform plane, said second data mask being coded as a function of said second signal, the normal to said second data mask forming a second angle with said second light beam path, said first and second angles being nonequal angles; and
   a holographic recording medium positioned in said Fourier Transform plane for recording a joint Fourier Transform.

7. A holographic system as described in claim 6 in which said means to cause said first and second light beams to recombine in said Fourier Transform plane comprise a first mirror in said first light beam path and a second mirror in said second light beam path.

8. A holographic system as described in claim 6 or claim 7 further comprising a passive phase mask in said first light beam path adjacent to said first data mask.

9. A holographic system as described in claim 6 and further including readout means comprising;
- an exposed holographic recording medium prepared by the recording means;
- means to illuminate said exposed holographic recording medium with a beam of substantially coherent light in a direction with respect to said recording medium anti-parallel to that of said second light beam path;
- a first order diffracted beam path emerging from said exposed recording material;
- cylindrical lens means with a known focal length positioned so that said first order diffracted beam path passes through said cylindrical lens means; and
- detection means positioned at a distance from said cylindrical lens means equal to said focal length of said cylindrical lens means.

10. A holographic system as described in claim 1, claim 2, claim 3, claim 4, claim 5, claim 6, claim 7, or claim 9 wherein a selected one of said first and second angles equals zero degrees.

11. A holographic system as described in claim 8 wherein a selected one of said first and second angles is equal to zero degrees.

* * * * *